United States Patent
Collins et al.

(10) Patent No.: US 11,435,228 B2
(45) Date of Patent: Sep. 6, 2022

(54) METHOD AND SYSTEM FOR IDENTIFICATION OF PHOSPHORS

(71) Applicant: Intelligent Material Solutions, Inc., Princeton, NJ (US)

(72) Inventors: Joshua E. Collins, Wallingford, PA (US); Howard Y. Bell, Princeton, NJ (US)

(73) Assignee: INTELLIGENT MATERIAL SOLUTIONS, INC., Princeton, NJ (US)

(*) Notice: Subject to any disclaimer, the term of this patent is extended or adjusted under 35 U.S.C. 154(b) by 0 days.

(21) Appl. No.: 17/260,322

(22) PCT Filed: Jul. 17, 2019

(86) PCT No.: PCT/US2019/042146
§ 371 (c)(1),
(2) Date: Jan. 14, 2021

(87) PCT Pub. No.: WO2020/018634
PCT Pub. Date: Jan. 23, 2020

(65) Prior Publication Data
US 2021/0293705 A1    Sep. 23, 2021

Related U.S. Application Data

(60) Provisional application No. 62/699,323, filed on Jul. 17, 2018.

(51) Int. Cl.
*G01J 3/10* (2006.01)
*G01J 3/14* (2006.01)
(Continued)

(52) U.S. Cl.
CPC ............... *G01J 3/10* (2013.01); *G01J 3/0297* (2013.01); *G01J 3/14* (2013.01); *G01J 3/42* (2013.01); *G01N 21/636* (2013.01); *G01J 2003/104* (2013.01); *G01J 2003/1286* (2013.01); *G01J 2003/423* (2013.01)

(58) Field of Classification Search
None
See application file for complete search history.

(56) References Cited

U.S. PATENT DOCUMENTS 6,264,107 B1   7/2001  Thomas, III et al.
6,365,904 B1 * 4/2002  Graves ............... G01N 21/6408
                                             250/459.1

(Continued)

OTHER PUBLICATIONS

International Search Report and Written Opinion for PCT/US2019/042146, dated Oct. 9, 2019.

*Primary Examiner* — Shawn Decenzo
(74) *Attorney, Agent, or Firm* — Meagher Emanuel Laks Goldberg & Liao, LLP

(57) ABSTRACT

Disclosed is a system and method for interrogating a photo-responsive material, such as for authentication purposes, utilizing a light source to illuminate a photo-responsive material, a detector to capture an emission from the photo-responsive material, and a processor to receive a response from the detector while the photo-responsive material is being illuminated after a maximum response has been received, then measuring a change in the received response.

15 Claims, 7 Drawing Sheets

(51) Int. Cl.
  *G01J 3/42* (2006.01)
  *G01J 3/02* (2006.01)
  *G01N 21/63* (2006.01)
  *G01J 3/12* (2006.01)

(56) References Cited

U.S. PATENT DOCUMENTS

| | | | |
|---|---|---|---|
| 7,354,733 B2 | 4/2008 | Bukshpan et al. | |
| 7,744,816 B2 | 6/2010 | Su et al. | |
| 8,400,509 B2 | 3/2013 | Rapoport et al. | |
| 8,742,369 B2* | 6/2014 | Rapoport | G07D 7/1205 250/458.1 |
| 8,822,954 B2* | 9/2014 | Li | B32B 27/308 250/459.1 |
| 9,181,477 B2 | 11/2015 | Collins et al. | |
| 9,563,798 B1* | 2/2017 | Laser | G06K 7/1404 |
| 10,732,426 B2* | 8/2020 | Kim | G02B 27/1086 |
| 2004/0061048 A1* | 4/2004 | Vasic | G07D 7/1205 250/271 |
| 2005/0178841 A1* | 8/2005 | Jones, II | G06K 7/12 235/491 |
| 2007/0127123 A1* | 6/2007 | Brown | G02B 27/144 359/556 |
| 2007/0229939 A1* | 10/2007 | Brown | G02B 27/1006 359/341.1 |
| 2012/0007125 A1 | 1/2012 | Ramer et al. | |
| 2013/0015651 A1* | 1/2013 | Lau | C09K 11/7774 428/389 |
| 2013/0119274 A1* | 5/2013 | Kane | C09F 3/00 252/301.4 R |
| 2013/0153789 A1* | 6/2013 | Smith | G01N 21/6428 252/301.4 R |
| 2014/0097359 A1* | 4/2014 | Vasic | G07D 7/1205 250/206 |
| 2015/0198531 A1* | 7/2015 | Talyansky | G01N 21/6408 250/459.1 |
| 2015/0252256 A1* | 9/2015 | Lau | B42D 25/373 252/301.5 |
| 2015/0260653 A1* | 9/2015 | Lazzouni | G07D 7/003 250/271 |
| 2020/0071610 A1* | 3/2020 | Lau | B42D 25/378 |

* cited by examiner

METHOD AND SYSTEM FOR IDENTIFICATION OF PHOSPHORS

CROSS-REFERENCE TO RELATED APPLICATIONS

This application claims priority to U.S. Provisional Application No. 62/699,323, filed on Jul. 17, 2018, which is herein incorporated by reference in its entirety.

FIELD OF THE INVENTION

The present disclosure is drawn to a method and system for authentication, and specifically to methods and systems that utilize the changes in emitted light that occur while a photo-responsive material is being illuminated, after a maximum response has been received, in order to make a determination as to authenticity of an article and/or identity of the phosphor.

BACKGROUND

Authentication of the validity of important and valuable articles, such as documents, machine parts, luxury goods, is critical in many fields. There is a great impetus to reduce fraud, that is to say, to prevent counterfeits and forgeries which are often elements of existing fraudulent use of the types of articles listed above. For example, counterfeit checks can be produced by criminals who copy or scan a legitimate check to extract the bank data, signature data, and account data and then produce checks which, for all practical purposes, look identical to the genuinely issued documents. An altered check or even other types of altered documents may use a genuine check or a genuine document, but where the payee, or the amount of the check that is to be paid, is altered, and presents difficulty of detection. It is also possible that stolen check stock may be utilized in order to forge checks where the payee, the amount and signature is fraudulently imprinted.

In order to improve security and detect fraudulent articles, it is most desirable to provide a machine-readable authentication or verification method. In many instances, the use of photo-responsive materials can aid in this regard. For example, by a phosphor embedded on a label can emit a green light that can be detected. However, many phosphors can emit green light, so simply making a determination of authenticity based on color is insufficient.

Further, some photo-responsive materials can be used to provide information to a reader. In such systems, the amount of information that can be passed along may be partially based on being able to distinguish between many types of photo-responsive materials.

As such, what is needed is a means of rapidly identifying a photo-responsive material based on one or more unique features or characteristics.

BRIEF SUMMARY

A first disclosed aspect is a system for interrogating a photo-responsive material with light. The system utilizes a light source to illuminate a photo-responsive material, a detector to capture an emission from the photo-responsive material, and a processor to receive a response from the detector while the photo-responsive material is being illuminated after a maximum response has been received, then measuring a change in the received response. Optionally, the light source may include a source of polychromatic incoherent light, a source of coherent light, may provide a continuous spectrum, or may utilize at least five laser diodes, one or more of which should be able to photo-activate the photo-responsive material. Optionally, at least one light source and detector are located on a single chip. The system may also identify the photo-responsive material based on the change in the detected response, and optionally also based on rise time, decay time, absorbed wavelength, and/or emitted wavelength. The system may optionally include additional components, including a lens to direct collected emissions towards a grating, a filter to prevent scattered excitation light from reaching the detectors, where each detector may be capable of detecting a different wavelength, an additional grating that directs incoherent light from the light source towards a focusing lens, which directs the light towards the photo-responsive material. The system may also optionally include circuitry to control the temperature of the photo-responsive material.

A second disclosed aspect is a method for interrogating a photo-responsive material. The method requires generating a beam of light to excite a photo-responsive material, detecting a response from photo-responsive material while the photo-responsive material is being excited and after a maximum response has been detected, and then measuring a change in the detected response. Optionally, the method also includes identifying the photo-responsive material based on the change in the detected response, and/or comparing the change in the detected response to data associated with a previously measured change. In some instances, the data associated with a previously measured change is stored on a remote server, and the server also contains data associated with at least one previously measured characteristic selected from the group consisting of rise time, decay time, absorbed wavelength, and emitted wavelength.

DETAILED DESCRIPTION

As used herein, articles such as "a" and "an" when used in a claim, are understood to mean one or more of what is claimed or described.

As used herein, the term "about [a number]" is intended to include values rounded to the appropriate significant digit. Thus, "about 1" would be intended to include values between 0.5 and 1.5, whereas "about 1.0" would be intended to include values between 0.95 and 1.05.

As used herein, the term "at least one" means one or more and thus includes individual components as well as mixtures/combinations.

As used herein, the terms "include", "includes" and "including" are meant to be non-limiting.

The present disclosure takes advantage of a unique feature that can only be measured when a photo-responsive material has an extended excitation period. The feature can be used as a "fingerprint" to identify specific photo-responsive materials, which include but are not limited to up- and down-converting nanoparticles, photochromic polymers, and supramolecular systems such as polymer-azobenzene complexes and other complexes formed by photoisomerization. This "fingerprint" allows for an improved authentication method and system.

A first aspect of the disclosed invention can best be described with respect to FIGS. 1A, 1B, 1C, 1D, and 2.

Figure 1A:
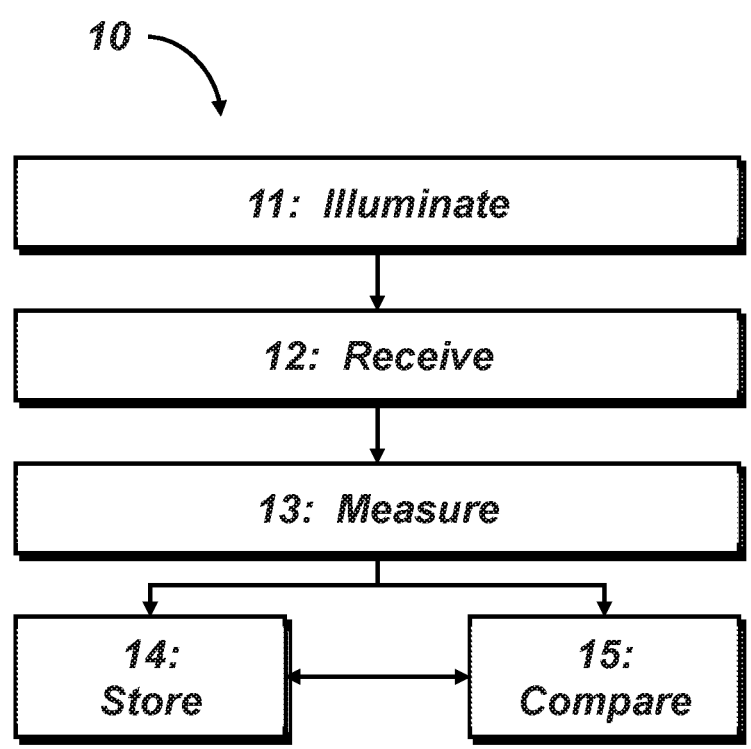
FIG. 1A is a flowchart of an embodiment of a disclosed method.

FIG. 1A shows a flowchart of an embodiment of a disclosed process. The first step of the method (10) generally requires illuminating (11) a photo-responsive material for a predetermined, relatively extended period of time. This relatively extended period of time is typically at least 1 ms, and may be at least 10, 20, 30, or 50 ms in length. As seen in FIG. 1C, in some embodiments the power density used during operation may be represented by a square wave, having a substantially constant power density (i.e., no upward or downward trend in power density) during the illumination, after which the light source is switched off or otherwise changed such that the emitted light is no longer detectable. Alternatively, as seen in FIG. 1D, some embodiments utilize shaped illumination, where, e.g., the power density of the illumination may vary throughout the period of illumination, resulting in responses that change during illumination. Preferred embodiments have at least portion of time in which the power density is substantially constant.

Figure 2:
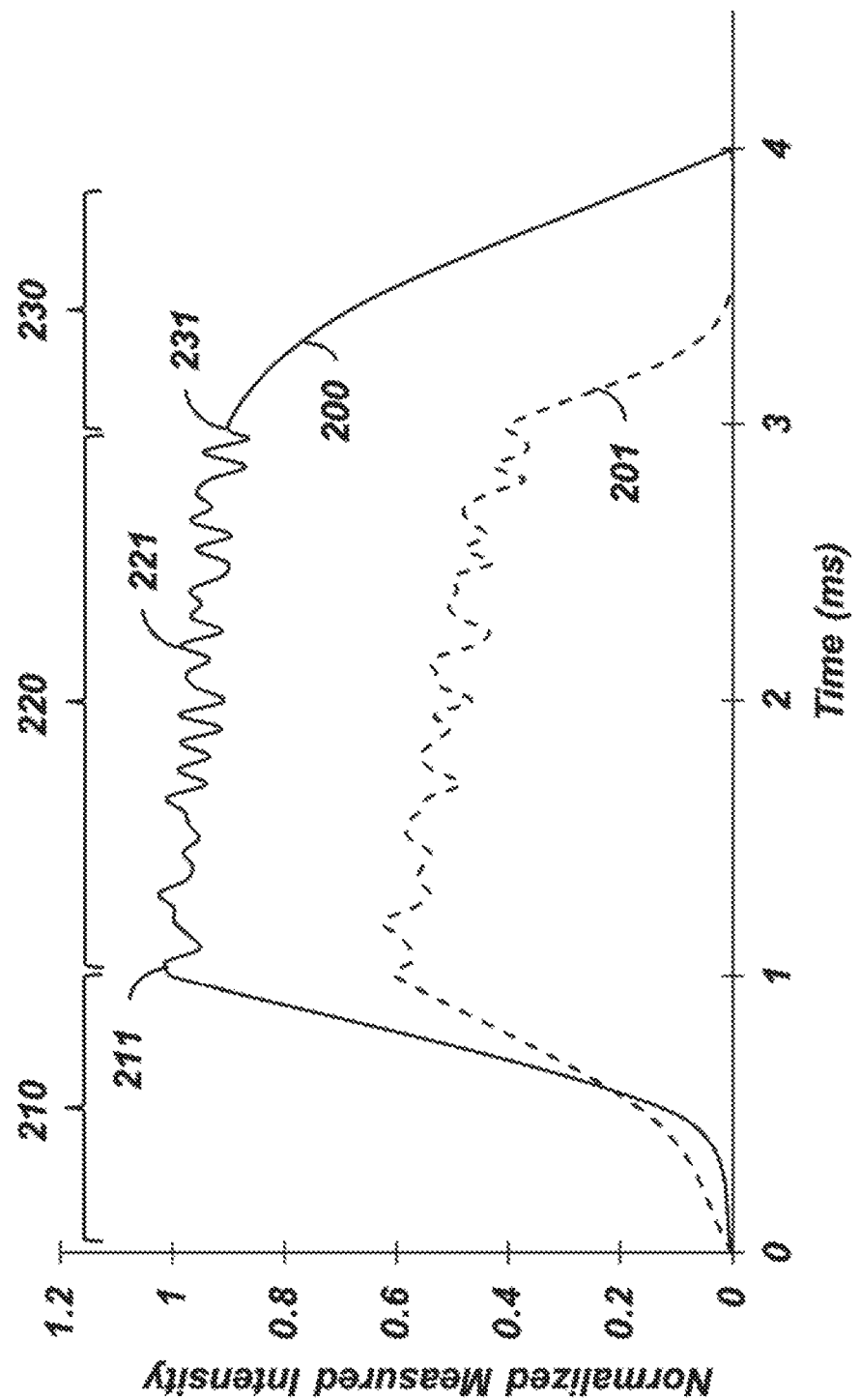
FIG. 2 is a graph of a response from a photo-responsive material in an embodiment of a disclosed system.

The second step of the method (10) requires receiving (12) a response from the photo-responsive material. What is received by the detector (125) can be understood with reference to FIG. 2. FIG. 2 is a graph showing examples of normalized measured responses at two different wavelengths (200, 201) of photo-responsive materials that were illuminated with a light pulse from a laser diode at a fixed current that begins at t=0 ms and ends at t=3 ms.

As can be seen in FIG. 2, the response at a first detected wavelength (200) when illuminating for a relatively extended period of time can generally be broken into three periods of time. The first period of time (210) is the period from the start of illumination until the response (200) has reached a maximum intensity (211). This first period of time (210) is related to rise time. After the response (200) has reached a maximum intensity (211), and only when the photo-responsive material continues to be illuminated, an intermediate period of time (220) can be detected. While the response exhibits a number of perturbations (221), when illuminated at a substantially constant power density, the overall response will change (such as trending downward, oscillating, etc.) from the time it reaches a maximum intensity (211) to the intensity at the time when the illumination ceases (231). As shown in FIG. 2, a similar trend is seen for the response at the second detected wavelength (201), although the absolute values are different. The third period of time (230) follows the stoppage of illumination until the response (200) reaches a minimum value (here, the detection limit). This third period of time (230) is related to decay time.

It should be noted that these basic periods of time relate to a phosphor being illuminated apply when the power density can be represented by a curve similar to the one seen in FIG. 1C. When power density is changed during illumination, it will naturally impact the response generated by the photo-responsive material. As such, preferably, this intermediate time period should be measured only during a period where the power density is substantially constant, where the time period is measured from when the local maximum response is received until the power density changes. However, this is not required, as there may be instances in which understanding the response to one or more changes in illumination are helpful in characterizing the photo-responsive material.

The third step in the method (10) optionally requires that, after the response is received, the response is measured (13). Typically, a processor is used to make appropriate calculations to measure the response.

In some embodiments, the change throughout the intermediate time period (220) is measured for one or more emitted wavelengths, while in others, only a portion of the intermediate time period (220) is considered (e.g., for a fixed period of time less than the entire intermediate time period (220), such as 1 µs, 5 µs, or 10 µs, or for a period of time that starts at some amount of time after the intermediate time period (220) begins). In some embodiments, only a single wavelength is considered. In other embodiments, multiple wavelengths are considered. In some embodiments, wavelengths at which no emissions are received are considered. In one embodiment, all wavelengths between 280 and 1200 nm could be measured. In another embodiment, only specific wavelengths are measured.

In some embodiments, the difference between the maximum intensity (211) and the intensity at the end (231) of the intermediate time period (220) is calculated. In some embodiments, the response in this time period is measured by curve-fitting the response. In some embodiments, the variability in the response (e.g., the perturbations (221)) are considered and measured.

In some embodiments, other characteristics of the response beyond those related to the intermediate time period (220) are also measured. In some embodiments, rise time, decay time, power density curve of the illumination used, absorbed wavelength, and emitted wavelength (including characteristics of the emitted wavelength(s), including peak emitting wavelength) are measured.

Other characteristics can also be measured. For example, to determine location of a photo-responsive material on an article or substrate, a system could capture an image of the article or substrate, and using known image-processing techniques, the position of a given photo-responsive material could be detected. For example, if the article or substrate is virtually divided into a grid, and the upper left virtual grid contains a printed arrow pointing to the upper left corner of the virtual grid, the system can then make calculations for where a photo-responsive material is on the article or substrate based on the size and location of the arrow.

The method (10) may involve optionally storing (14) the measured response or characteristics of an expected response.

In one approach to build databases of known photo-responsive materials, the responses may optionally be stored in a received response database by storing at least a photo-responsive material identification code (the name of the material, article, substrate, etc., or a code representing the name of the material, article, substrate, etc.) and a received response. Each received response may also optionally be assigned a sample code. In this manner, a single photo-responsive material may have multiple stored received responses against which a sample may be compared. In one example, a photo-responsive material database contains a photo-responsive material identification code (here, an 8 character code representing the name of an article of clothing), a sample code (here, a 16 character code representing the sequential number of each article of clothing that was made), and the data corresponding to the received response for that particular sample code. In another example, the database contains a photo-responsive material identification code (here, a 16-bit code representing a particular material) and a received response. In another example, the database contains multiple received responses for the same photo-responsive material identification code (here, a 16-bit code representing a particular material), but no sample code is used to distinguish the various received responses.

Alternatively, or in addition to the received response database, a database containing, e.g., previously measured responses can be created. In some embodiments, this database is stored locally on a device, while in other embodiment, this database is stored remotely, such as on a cloud-based server. This database will typically contain a photo-responsive material identification code (the name of the material, article, substrate, etc., or a code representing the name of the material, article, substrate, etc.), and a set of characteristics against which the measured response is compared. That is, while the received response database stores the entire received response, this smaller database contains just those items that the system needs to compare measured responses. Each set of characteristics may also optionally be assigned a sample code. In one example, this database contains a photo-responsive material identification code (here, a hash of a credit card number), a sample code (here, a code representing where on the card a particular photo-responsive material is located), and the characteristics associated with a measured response from that particular location (here, a rise time, a decay time, and a difference between the maximum response and the response at the point in time the illuminate ceased).

Once the characteristics of the response have been measured, the method then compares (15) the response with, e.g., a previous response or a set of predetermined expected characteristics (such as may be determined from an aggregation of responses or determined through modeling a particular system) in order to identify or authenticate the phosphor.

In some embodiments, some or all of the received response is compared to previously received responses. For example, in one embodiment, only the response correlating to the intermediate time period (220) is compared to previously received responses. If the received responses match, the system can positively identify a phosphor material, authenticate a substrate or article, etc.

In some embodiment, the measured response is compared to previously measured responses. In one embodiment, each measured response is normalized and compared to previously measured responses in a database to determine the composition of the photo-responsive material that emitted the response. In another embodiment, all detected responses, without being normalized, are compared to a previously measured set of responses to verify the responses match.

Note that in some embodiments, the received or measured response does not need to match exactly with a previously received or measured response in order to be considered a match. In one example, a sample was illuminated three times with a delay between illuminations, and the difference between the maximum intensity and the intensity at the end were measured. The measured responses were then compared to multiple previously measured responses, and the results were considered a match if the differences were not statistically significant ($p<0.05$).

Depending on the results of the comparison, the method can then pass information to the user—e.g., the identity of the phosphor, a flag indicating whether the article should be considered authentic, etc.

Figure 1B:
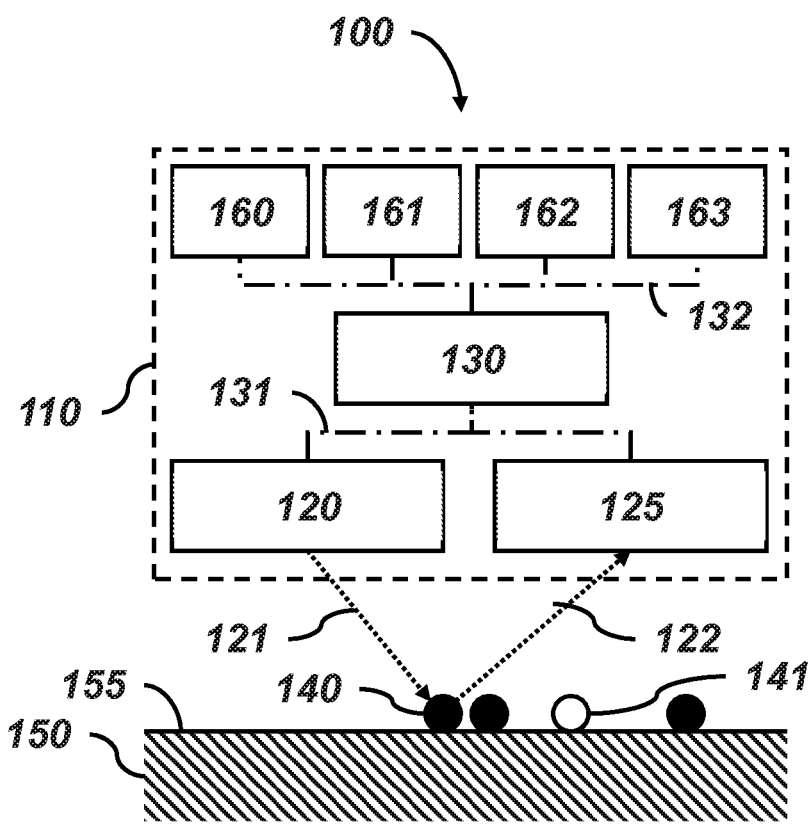
FIG. 1B a schematic of an embodiment of a disclosed system
Figure 1C:
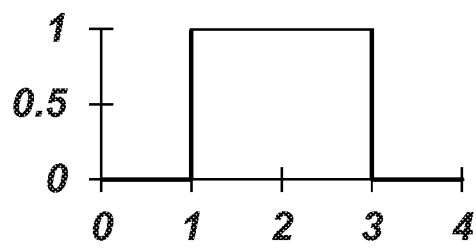
FIGS. 1C and 1D are graphs of normalized power density curves used to illuminate a photo-responsive material.
Figure 1D:
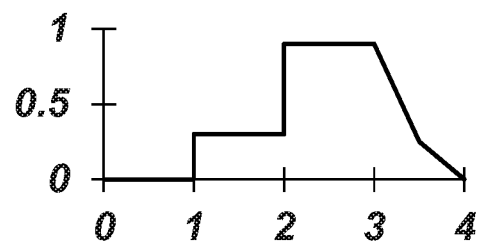

FIG. 1B shows a schematic of a simplified functioning system (100). One or more devices (110) includes one or more light sources (120) and one or more detectors (125) operably connected (131) to one or more processors (130). In some embodiments, each light source (120) and each detector (125) is a separate component. In some embodiments, at least one light source (120) and at least one detector (125) are located on a single chip.

Under the control of the one or more processors (130), one or more light sources (120) emit at least one predetermined wavelength of light (121). Generally, the one or more processors (130) will cause the light source (120) to send a pulse of light for a predetermined length of time. The light source (120) is configured to direct the at least one predetermined wavelength of light (121) towards one or more photo-responsive materials (140, 141) located e.g., on a surface (155) of a substrate (150). The photo-responsive materials (140, 141) will absorb at least some of the predetermined wavelengths of light (121) and will then emit a different wavelength of light (122) that can be received by the detector (125).

The photo-responsive materials (140, 141) may be identical materials, or one or more of the photo-responsive materials (141) may be different from other photo-responsive materials (140) in the system. In some embodiments, one or more of the photo-responsive materials emits at multiple wavelengths, and some or all of those multiple wavelengths may be detected.

The photo-responsive materials (140, 141) may be rare earth particles—inert, non-toxic materials capable of being modified with a variety of surface chemistries.

Potential crystal host compositions of rare earth particles can include but are not limited to halides such as $NaYF_4$, $LiYF_4$, $BaYF_5$, $NaGdF_4$, $KYF_4$, oxides such as $Y_2O_3$, $Gd_2O_3$, $La_2O_3$, oxysulfides such as $Y_2O_2S$, $Gd_2O_2S$, $La_2O_2S$. A selection of rare earth dopants can then be incorporated into the host lattice at varying concentrations. Single or multiple dopants can be incorporated into the host lattice giving rise to a unique optical property that can be readily measured using a paired optical detection device. Examples of dopant(s) and combinations are; YbEr, YbTm, YbHo, Er alone, Yb alone, Tm alone, NdTm, YbNd, NdTmYb. The dopants can be incorporated into the host lattice anywhere from 0.02%-90% total rare earth doping concentration. For example, one composition could be $NaYF_4$: Yb(0.7),Tm(0.02) with Yttrium (Y) comprising ~18% of the total rare earths, Ytterbium (Yb) 70%, and Thulium (Tm), 2%, which yields a 72% total rare earth doping concentration. The particle size range of these rare earth particles are optimally below 1 micron.

These rare earth particles can be further combined with various inorganic materials (e.g., gold and silver nanoparticles) and organic markers (e.g., rare earth chelates, Pd/Pt porphyrin dyes) markers that can be conjugated to the crystal surface providing, e.g., either enhanced plasmonic emissions or Fluorescence resonance energy transfer (FRET)/Luminescence resonance energy transfer (LRET) energy transfer conversions in order to, e.g., increase sensitivity and/or improve multiplexed detection capabilities.

Preferred rare earth particles have an extremely efficient and pure beta phase, crystalline structures with tunable morphologies, with particle sizes and optical properties that are substantially identical particle to particle. Such intersystem uniformity enables even single particle detection and very sensitive quantification capabilities due to the low signal to noise from the tunable spectral and lifetime properties as well as signal purity within the particle systems.

Suitable rare earth particles include the morphologically and size uniform, monodisperse phosphor particles described in U.S. Pat. No. 9,181,477 B2, which is incorporated herein in its entirety.

In one example, three emission bands were monitored simultaneously for $Gd_2O_2S$ doped at 6% with $Er^{3+}$: $^2H_{9/2}$ (monitored at least one wavelength between 400-450 nm), $^4S_{3/2}/^2H_{11/2}$ (monitored at least one wavelength between 520 and 560 nm) and $^4F_{9/2}$ (monitored at least one wavelength between 635-700 nm).

While or after the response has been received by the detector (125), it can be sent to the one or more processors (130) to be, e.g., compared, measured, and/or stored.

There are several additional features which may optionally be present in this simplified embodiment of a system (100). In some embodiments, the one or more processors (130) are operably connected (132) to at least one audio or video output device (160), such as a display, one or more status lights, or a speaker. The audio or video output device (160) will typically be used to convey information to a user. This can allow the user to be aware of instances where a comparison has succeeded (or failed), where an article is deemed to be (or not be) authentic, or simply making the user aware of what the system is doing any given point in time. In some embodiments, the audio or video output device (160) shows the user a green checkmark if a match is found in a database, and a red "X" if no match is found.

In some embodiments, the system (100) may optionally include at least one button or switch (161) operably connected (132) to the one or more processors (130). If one or more of the devices (110) are hand-held devices, the at least one button or switch (161) can be used to turn the device (110) on and/or cause the processor (130) to start the interrogation process and "read" the photo-responsive material on an article or surface.

In some embodiments, the system (100) may optionally include at least one memory (162) operably connected (132) to the one or more processors (130). The memory (162) may be volatile and/or non-volatile memory. The memory (162) may be used to store, e.g., one or more databases related to the responses.

In some embodiments, the system (100) may optionally include at least one wired or wireless interface (163) operably connected (132) to the one or more processors (130). This interface (163) allows the device to connect to, e.g., a mobile phone or a remote server.

In addition to the simplified system indicated in FIG. 1, more complex systems can be used.

Figure 3:
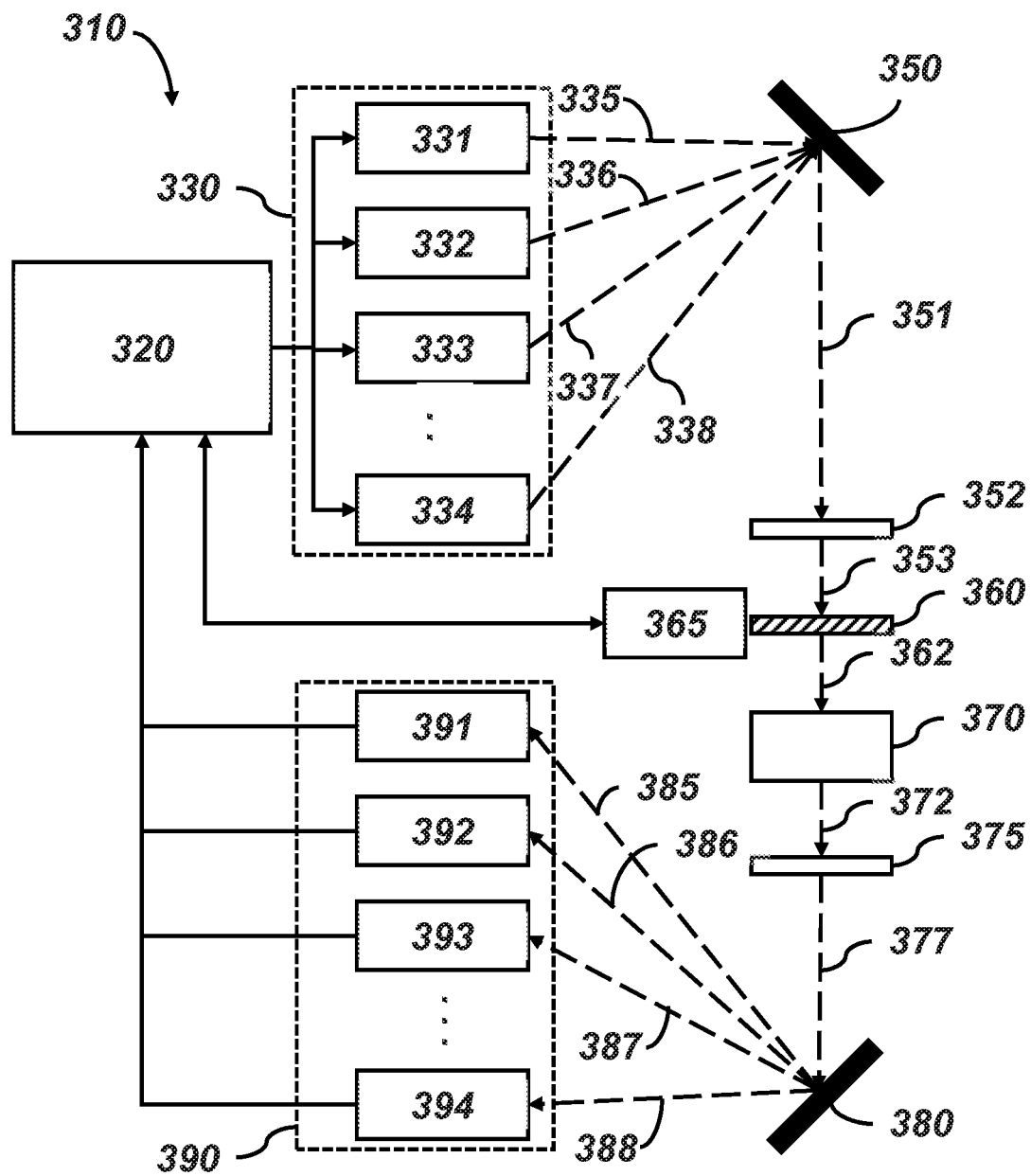
FIG. 3 a schematic of an embodiment of a disclosed system

Referring to FIG. 3, an alternate embodiment of a system (310) is disclosed, which allows shaped light to be used to illuminate the photo-responsive materials, which allows even greater control over the received responses. In this embodiment, one or more processors (320) are operably connected to, and control, a source (330) of polychromatic incoherent light. The source (330) of polychromatic incoherent light may include any such source known to those of skill in the art. The source (330) may include one or more light sources. While the particular wavelengths that the light source needs to generate will necessarily vary based on the particular photo-sensitive material, certain embodiments utilize a source (330) that generates both visible and IR wavelengths of light. In other embodiments, the source (330) generates only visible or IR wavelengths of light.

Thermal light sources such as glowing filaments, sunlight, flash lamps, etc. each confers a broad spectrum for potential use. While these sources may be utilized, they are challenging to focus and shape spectrally because they lack spatial coherence, nor can they be modulated at high frequencies without the use of external devices (e.g., electro-optic modulators). On the other hand, semiconductor-based sources such as light emitting diodes (LEDs), super-luminescent photodiodes or modulated laser diodes (LDs) can be directly modulated in the RF regime by varying their input current. Each of these sources has a narrow bandwidth compared to a thermal source, but a larger spectrum can be covered by combining several of them with different center wavelengths. LDs have two important advantages over LEDs or super-luminescent photodiodes: (1) their output spectral intensities are generally one to two orders of magnitude greater and (2) they are more spatially coherent. Building incoherent sources from LDs might seem contradictory since laser light is coherent by nature. However, the source may be considered incoherent because the LDs used have coherence times of few picoseconds while the fluorescence of a photo-responsive material is integrated over (at least) microseconds and the LDs bear no phase relationship to each other.

Thus, some embodiments include, but is not limited to, a plurality of laser diodes (331, 332, 333, 334). In preferred embodiments, the source (330) comprises five or more laser diodes (331, 332, 333, 334), each diode configured to emit a beam of light (335, 336, 337, 338) having a unique peak wavelength, one or more of which needs to meet the requirement that they individually photo-activate the photo-responsive material (360) be it a chemical species, biochemical species or material compound. In certain embodiments, the number of individual peak wavelengths the source generates is based on the number of fundamental up- or down-conversion transitions of a photo-responsive material.

Some embodiments use LDs that cover a portion of the wavelengths between about 750 nm and about 1600 nm. One example setup consists of collimated outputs of seven commercially available mid-power LDs (785 nm±3 nm, 90 mW; 808 nm±3 nm, 200 mW; 830 nm±3 nm, 200 mW; 905 nm±3 nm, 100 mW; 980 nm±3 nm, 200 mW; 1320 nm±3 nm, 300 mW; 1550 nm±8 nm, 300 mW; Thorlabs Inc.) that were refracted on a grating to recombine them into a single beam. The resulting polychromatic beam was focused on the sample with a lens (f=5 cm). The LDs were driven by an eight channels programmable current source built around an 80 MHz microprocessor (PIC32MX795F512H, Microchip Inc.). Each channel could output a particular current waveform (including, but not limited to, prerecorded current waveform) whose shape, resolution and length could be adjusted independently. Note that the waveforms that control the output of the source are sometimes referred to herein as "SILC controls". Care was taken to eliminate crosstalk between the LD channels. The current resolution was 16 bits. The minimum time resolution per channel was 2 µs corresponding to the shortest possible optical pulse.

The output power of a LD follows the equation $P=\eta(I-I_{Th})$ where $I_{Th}$ is the current threshold and $\eta$ is the slope efficiency in W/A. Below $I_{Th}$ there is no laser emission, and the diode's output power is negligible. No attempt was made to precisely measure the value of $I_{Th}$ or $\eta$ as they are specific to each LD and usually change over time as the LD is operated. The maximum current, $I_{max}$, that each channel could output did not exceed the maximum input current indicated in the manufacturer's datasheet.

In some embodiments, a coherent source (not shown in FIG. 3), in addition to the incoherent source, is also utilized. The coherent source is otherwise controlled in the same fashion as the incoherent source.

In FIG. 3, optional grating (350) is configured to direct the light (335, 336, 337, 338) emitted from the source (330) towards (351) an optional focusing lens (352). The focusing lens (352) then focuses the light (353) towards a photo-responsive material (360).

The photo-responsive material (360) may include any material that responds to at least one of the unique peak wavelengths emitted by the source (330), and preferably comprises an up- and/or down-converting nanocrystal, photo-responsive supramolecular systems including pseudorotaxanes, rotaxanes, azobenzene-polymer complexes, porphyrins, cholesteric liquid crystals, rare earth and other metal-polymer complexes.

In one example, the photo-responsive material was $Gd_2O_2S$ doped at 6% with $Er^{3+}$. This is a well-known upconverting phosphor (UCP) that can efficiently shift near-IR light into the visible spectrum. UCP materials have a wide range of applications including, solar energy harvesting, medical therapeutics and bioimaging, and gain media in lasers.

The $Gd_2O_2S:Er^{3+}$ (6%) powder absorption spectrum is characterized by sharp peaks that are indicative of a homogeneous crystal field: only one lattice site is available for the $Er^{3+}$ ion in the crystal host. A scheme based on the $Er^{3+}$ ions energy levels depicts potential mechanisms responsible for light upconversion: ground state absorption (GSA), excited state absorption (ESA) and energy transfer upconversion (ETU). While ESA and ETU are possible phenomena with dye molecules, the long-lived excited states of $Er^{3+}$ makes these processes much more likely resulting in substantial and observable populations in highly excited states.

ETU occurs in optical materials that are highly doped with lanthanides. When embedded in a solid matrix, an $Er^{3+}$ ion may interact with a close neighbor. An excited $Er^{3+}$ ion can spontaneously relax to the ground state by transferring its energy to a nearby $Er^{3+}$ ion. If that ion is already in an excited state, the added energy promotes it to a higher energy level whose luminescence to the ground level has a shorter wavelength than the incident photons. This process can be viewed as analogous to a bimolecular elementary reaction where new species are created when the reactants collide. However, in this case neither the 'reactants' nor the 'products' can freely diffuse (although energy migration between neighboring $Er^{3+}$ ions is tantamount to a diffusion mechanism). Note that ETU is reversible and may also depopulate excited states.

Of seven LDs used in an example system, four of them, 808 nm, 830 nm, 980 nm and 1550 nm were resonant with $Er^{3+}$ near-IR fundamental transitions which permit initiating upconversion processes. The three other LDs (785 nm, 905 nm and 1310 nm) do not interact with ground state $Er^{3+}$ ions but may resonate with transitions between excited states thereby exciting the sample through ESA. Other commercially available LDs (e.g., 405 nm, 450 nm, 488 nm, 515-532 nm and 650-680 nm) could have been used to directly promote $Er^{3+}$ ions into the targeted levels, but the example approach chose to populate the latter via upconversion schemes (i.e., using only near-IR light) to allow for non-trivial controls, again mimicking the complexity expected in multi-species chemical reactions.

In some examples, samples were made by mixing $Gd_2O_2S:Er^{3+}$ (6%) powder in polyurethane and applying a thin coating on an optically transparent substrate.

The system (310) may optionally include temperature control circuitry (365), which may include a resistive heating element and/or a Peltier device, in order to control the temperature of the photo-responsive material (360).

The photo-responsive material may respond to excitation from the source by emitting (362) of at least one wavelength of light. As shown in FIG. 3, a lens (370) may be configured to collect the emission (362) from the photo-responsive material (360) and pass it through (372) a filter (375) that prevents any scattered excitation light from reaching the detectors (391, 392, 393, 394), and direct it (377) toward a grating (380) for diffracting the collected emission (372, 377). The diffracted emission (385, 386, 387, 388) is then captured by at least one detector (390), and may include, but is not limited to, a plurality of detectors (391, 392, 393, 394). Each detector should be capable of recording a different emission band. There is no explicit limit to the number of detectors required; the number depends on how many wavelengths a user desires to monitor simultaneously. For example, one could have multiple notch filtered avalanche photodiodes (APDs) for monitoring, e.g., 480 nm, 540 nm, 660 nm, 800 nm, 980 nm, 1543 nm, and 2.7 μm.

Referring again to FIG. 3, each detector is operably connected to the one or more processors (320). The one or more processors (320) receives the response from the at least one detector (390) and measures various aspects of the response.

While in some embodiments, the one or more processors (320) only measures aspects of the response after the entire response from the photo-responsive material is received from the detector (390), that is not a requirement of the disclosed system. In some embodiments, some aspects of the response are measured while the photo-responsive material is being illuminated. For example, in some embodiments, the rise time is measured while the photo-responsive material is still being illuminated.

Figure 4A:
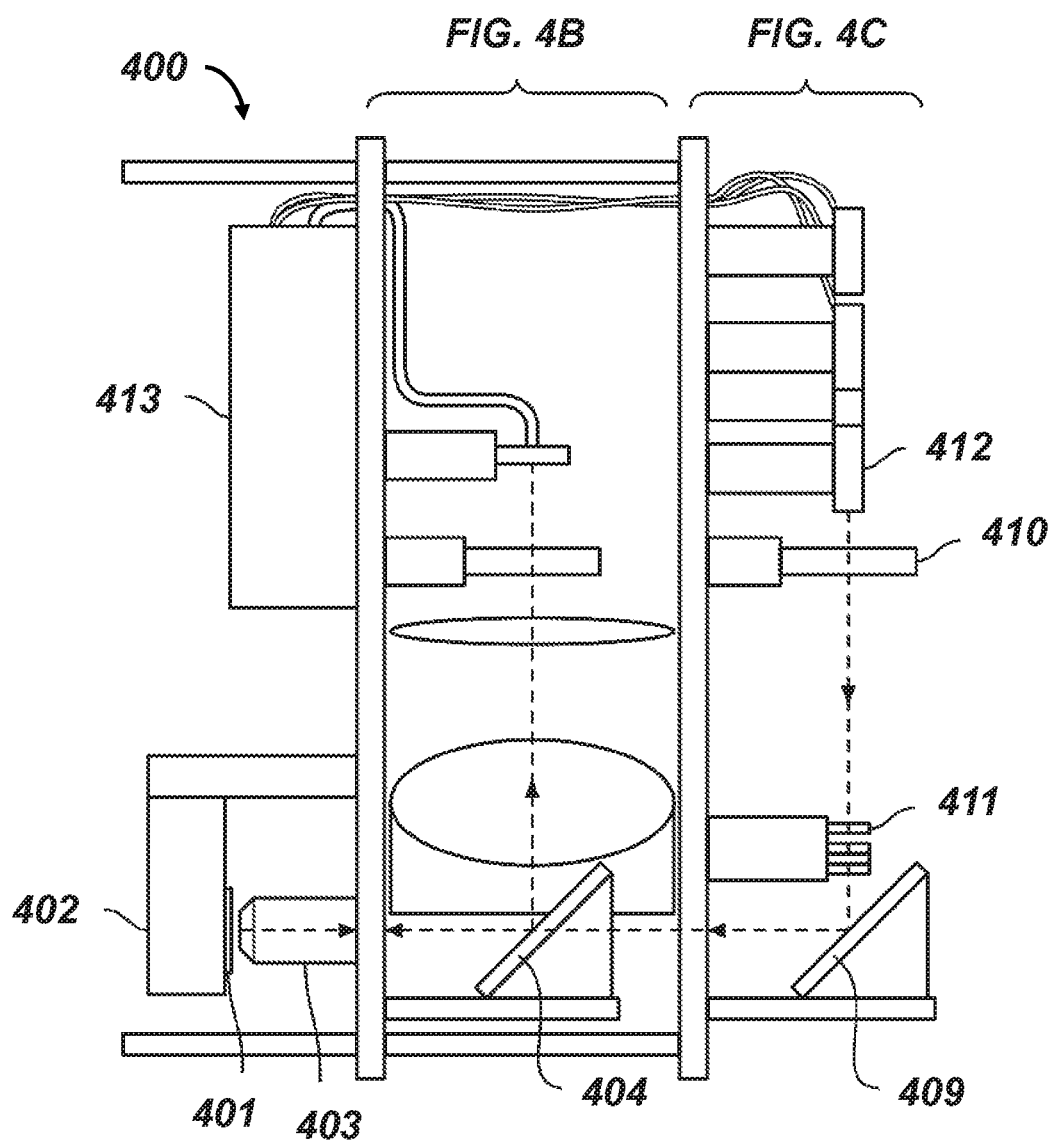
FIGS. 4A, 4B, and 4C are side (4A) and top (4B, 4C) of an embodiment of disclosed system.
Figure 4B:
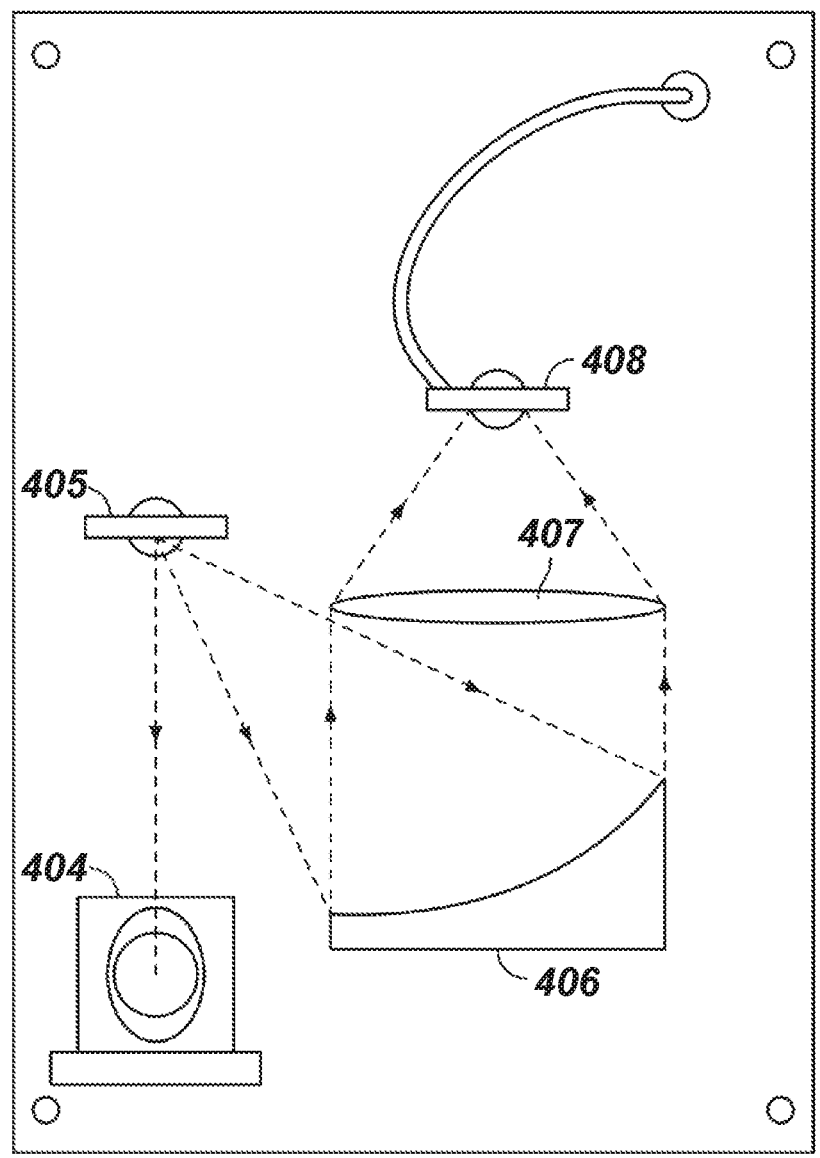
Figure 4C:
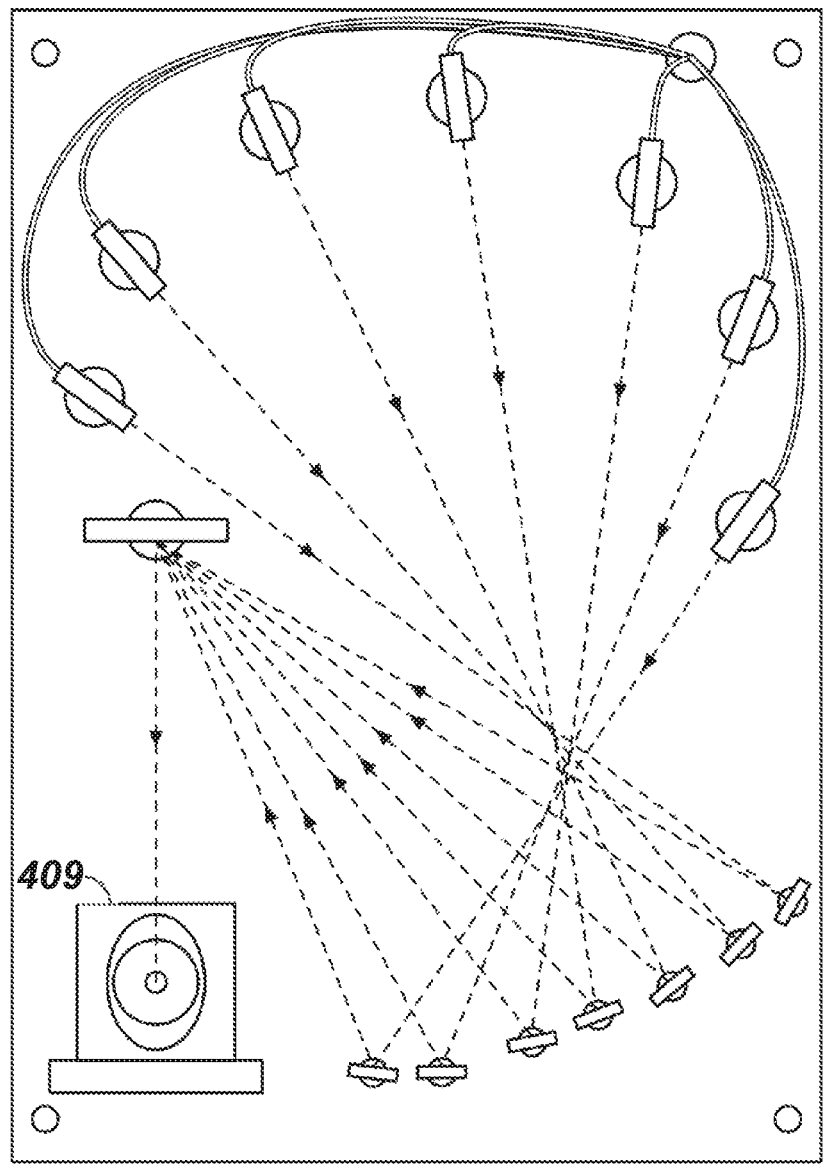

An example of one system schematic can be seen in reference to FIGS. 4A-4C. The side view is shown in FIG. 4A. The system (400) has electronic circuitry (413) that allows for synchronous operation of the laser diodes and recording of the system's response. In this example, the circuitry (413) is operably connected to a separate computer (either a desktop computer, a server on the internet, etc.), where the adaptive feedback loop is implemented. However, in other embodiments, the feedback loop is handled by an onboard computer. The circuitry (413) controls both the laser diodes on the excitation platform (see FIG. 4C) and the detector on the detection platform (see FIG. 4B). The circuitry first causes the laser diodes (412) to generate multiple wavelengths in the NIR-IR (Near InfraRed-Infra-Red) spectrum. Here, there are 7 laser diodes arranged around the top of the excitation platform (as seen in FIG. 4C). In this example, the generated wavelengths then each reflect off one of the 7 mirrors (411) at the bottom of the excitation platform, which may be gold-plated mirrors. The generated wavelengths are reflected towards a NIR-IR reflective diffraction grating (410). The combined beams are then directed towards another mirror, such as another gold-plated mirror (409). The beam passes through an opening in the base of the excitation platform, passes through a dichroic mirror (404) which is configured to pass NIR-IR but reflect UV-VIS-NIR(UltraViolet-VISible-Near InfraRed), and into a microscope objective (403). From there, the sample photo-responsive material (401), which is on a sample holder (402), is irradiated. The sample (401) then emits some light in the UV-VIS-NIR spectrum, which passes back through the microscope objective (403) and into the detection platform portion of the system. The emitted light then is reflected by the dichroic mirror (404) which is configured to reflect the emitted light towards a UV-VIS-NIR reflective diffraction grating (405). The dichroic mirror, or other filter, may also be used to prevent any scattered excitation light from reaching the detectors. The light is then reflected towards a 45° off-axis parabolic mirror (406), which directs the light up towards an aspherical condensing lens (407) and finally to a photodiode linear array (408) (such as a Si or AsGa photodiode linear array), which sends the detected signals to the electronic circuitry (413) for use with the adaptive feedback loop.

Those skilled in the art will recognize or be able to ascertain using no more than routine experimentation, many equivalents to the specific embodiments of the invention described herein. Such equivalents are intended to be encompassed by the following claims.

What is claimed is:

1. A system for interrogating a photo-responsive material with light, comprising:
    a light source configured to illuminate a photo-responsive material;
    at least one detector in an optical path of an emission from the photo-responsive material; and
    a processor configured to:
        receive a response from the at least one detector, the response including:
            a first part occurring while the photo-responsive material is being illuminated, before a maximum response has been received;
            a second part occurring after a maximum response has been received while the photo-responsive material continues to be illuminated; and
            a third part occurring after the photo-responsive material has been illuminated; and
        measure a change in the received response.

2. The system according to claim 1, wherein the light source is a source of polychromatic incoherent light.

3. The system according to claim 1, wherein the light source is configured to provide a continuous spectrum.

4. The system according to claim 3, wherein the light source comprises at least five laser diodes, one or more of which needs to meet a requirement that they individually photo-activate the photo-responsive material.

5. The system according to claim 1, wherein the processor is further configured to identify the photo-responsive material based on the change in the second part of the received response.

6. The system according to claim 1, wherein the processor identifies the photo-responsive material based on the change in the second part of the received response and at least one additional characteristic selected from the group consisting of rise time, decay time, absorbed wavelength, and emitted wavelength.

7. The system according to claim 1, further comprising:
    a lens configured to collect an emission from the photo-responsive material and direct it towards a first grating for diffracting the collected emission; and
    a filter configured to prevent any scattered excitation light from reaching the at least one detector,
    wherein the at least one detector is in the path of the diffracted emission, and
    wherein each detector is capable of recording a different emission band.

8. The system according to claim 1, further comprising:
    a second grating configured to direct incoherent light from the light source towards a focusing lens; and
    a focusing lens for focusing the light towards the photo-responsive material.

9. The system according to claim 1, further comprising circuitry configured to control a temperature of the photo-responsive material.

10. The system according to claim 1, wherein the light source comprises a coherent light source.

11. The system according to claim 1, wherein the at least one detector comprises a first detector, and wherein the light source and the first detector are on a single chip.

12. A method for interrogating a photo-responsive material, comprising:
    generating a beam of light from a light source;
    exciting a photo-responsive material with the beam;
    detecting a response from photo-responsive material, the response including:
        a first part occurring while the photo-responsive material is being illuminated, before a maximum response has been received;
        a second part occurring after a maximum response has been received while the photo-responsive material continues to be illuminated; and
        a third part occurring after the photo-responsive material has been illuminated; and
    measuring a change in the detected response.

13. The method according to claim 12, further comprising identifying the photo-responsive material based on the change in the second part of the detected response.

14. The method according to claim 12, further comprising comparing the change in the second part of the detected response to data associated with a previously measured change.

15. The method according to claim 14, wherein the data associated with a previously measured change is stored on a remote server that also contains data associated with at least one previously measured characteristic selected from the group consisting of rise time, decay time, absorbed wavelength, and emitted wavelength.

* * * * *